United States Patent
Pesu et al.

(10) Patent No.: US 6,730,137 B2
(45) Date of Patent: May 4, 2004

(54) VEGETABLE OIL CANDLE

(75) Inventors: Maxine Pesu, Gahanna, OH (US); Heather Mathews, Reynoldsburg, OH (US)

(73) Assignee: Bath & Body Works, Inc., Reynoldsburg, OH (US)

( * ) Notice: Subject to any disclaimer, the term of this patent is extended or adjusted under 35 U.S.C. 154(b) by 0 days.

(21) Appl. No.: 09/991,983

(22) Filed: Nov. 14, 2001

(65) Prior Publication Data

US 2003/0091949 A1 May 15, 2003

(51) Int. Cl.$^7$ ............... C11C 5/00; F23D 3/16
(52) U.S. Cl. ............................ 44/275; 431/288
(58) Field of Search .................. 44/275, 385, 389; 431/288; 508/459, 486, 488

(56) References Cited

U.S. PATENT DOCUMENTS

| | | | | |
|---|---|---|---|---|
| 1,954,659 A | * | 4/1934 | Will ........................ 87/21 |
| 1,958,462 A | * | 5/1934 | Baumer | |
| 1,959,164 A | * | 5/1934 | Jaegds ..................... 87/21 |
| 2,159,218 A | * | 5/1939 | MacLuser ................. 87/19 |
| 2,377,106 A | * | 5/1945 | Reswick ................. 508/488 |
| 2,638,411 A | * | 5/1953 | Thompson .............. 44/275 |
| 3,046,101 A | * | 2/1962 | Tenach .................. 44/275 |
| 3,216,921 A | * | 11/1965 | Fox ....................... 208/21 |
| 3,384,312 A | * | 5/1968 | Easterday | |
| 3,429,815 A | * | 2/1969 | Drake .................... 508/488 |
| 3,613,658 A | * | 10/1971 | Knowles et al. | |
| 3,630,697 A | * | 12/1971 | Dulling et al. | |
| 3,645,705 A | * | 2/1972 | Miller et al. | |
| 3,844,706 A | * | 10/1974 | Tsaras .................... 431/288 |
| 3,871,815 A | * | 3/1975 | Cangardel | |
| 4,002,706 A | * | 1/1977 | Pretorius | |
| 4,118,203 A | * | 10/1978 | Beadmore et al. | |
| 4,134,718 A | * | 1/1979 | Kayfetz et al. | |
| 4,239,546 A | * | 12/1980 | Russell .................. 106/270 |
| 4,390,590 A | * | 6/1983 | Saunders et al. ........ 428/383 |
| 4,507,077 A | * | 3/1985 | Sapper | |
| 4,568,270 A | * | 2/1986 | Marcus et al. ......... 431/288 |
| 4,608,011 A | * | 8/1986 | Comstock | |
| 4,614,625 A | * | 9/1986 | Wilson | |
| 4,693,890 A | * | 9/1987 | Wilson et al. | |
| 4,759,709 A | * | 7/1988 | Luken, Jr. et al. | |
| 4,813,975 A | * | 3/1989 | Poulina et al. | |
| 4,855,098 A | * | 8/1989 | Taylor | |
| 5,171,329 A | * | 12/1992 | Lin | |
| 5,578,089 A | * | 11/1996 | Elsamaloty | |
| 5,879,694 A | * | 3/1999 | Morrison et al. | |
| 5,919,423 A | * | 7/1999 | Requejo et al. | |
| 6,063,144 A | * | 5/2000 | Calzada et al. ......... 44/275 |
| 6,099,877 A | * | 8/2000 | Schuppan ............... 431/288 |
| 6,171,560 B1 | * | 1/2001 | Pesu et al. .............. 422/305 |
| 6,214,918 B1 | * | 4/2001 | Johnson et al. .......... 44/275 |
| 6,284,007 B1 | * | 9/2001 | Tao ....................... 44/275 |

* cited by examiner

Primary Examiner—Margaret B. Medley
(74) Attorney, Agent, or Firm—Colucci & Umans; Peter C. Michalos; Angelo Notaro

(57) ABSTRACT

A candle composition has a paraffin wax mixture of a high melting point paraffin wax and a low melting point paraffin wax, and a hydrogenated vegetable oil that is present in a greater amount than the mixture of the varying grades of paraffin wax, and the vegetable oil contains no more than 0.15% free fatty acid, with the remainder being triglycerides. Candles of the composition have good burn characteristics, particularly good fragrance intensity and produce a unique crystallization effect after the first burn.

32 Claims, 1 Drawing Sheet

VEGETABLE OIL CANDLE

FIELD AND BACKGROUND OF THE INVENTION

The present invention relates generally to the field of candlemaking and in particular to a candle that has a greater concentration of hydrogenated vegetable oil than paraffin wax, where the hydrogenated vegetable oil contains no more than 0.15% free fatty acid and a remaining portion of triglycerides, while the paraffin wax may be a combination of more than one type of wax with varying melting points.

Many prior patents disclose candle compositions intended to burn more cleanly or longer having various components. Some patents teach using vegetable oils in the candle composition.

U.S. Pat. No. 1,954,659 discloses a homogenous, solid, and self-sustaining candle formed of 50% or more of a hydrogenated vegetable oil, preferably rape-seed oil, and a wax including paraffin wax, stearic acid and beeswax. One embodiment disclosed in the patent has 49% wax and 51% hydrogenated vegetable oil. The U.S. Pat. No. 1,954,659 patent teaches that the candle may be made of other types of hydrogenated vegetable oils besides rape-seed oil, provided the oil comprises 50% or more of the composition. But, the use of vegetable oils with less than naturally occurring amounts of free fatty acids is not disclosed.

U.S. Pat. No. 1,958,462 teaches that candles can be made from vegetable oils combined with beeswax. The candle composition has 20% by weight pure beeswax and up to 80% of a hydrogenated vegetable oil. U.S. Pat. No. 1,958,462 specifically discloses that soy, cottonseed, rape-seed, and olive oil may be used to make the candle. These oils are non-drying or semi-drying, and absorb less iodine than vegetable fats and drying vegetable oils. That is, non-drying and semi-drying oils inherently have a lower iodine value than vegetable fats and drying vegetable oils. These exemplary oils are preferred because they have low iodine values. But, using oils with reduced concentrations of free fatty acids is not disclosed.

U.S. Pat. No. 2,159,218 teaches an opaque wax comprising a mixture of paraffin wax with a melting point ranging from 120–160° F. and 0.5 to 5% of a hydrogenated fat or vegetable oil. Cottonseed oil is specified as a preferred vegetable oil for the composition.

U.S. Pat. No. 1,959,164 discloses a candle composition formed from vaporizable and combustible materials such as wax or paraffin. An exemplary embodiment focuses on the inclusion of a synthetic organic resinous coating for improving burning qualities and preventing candle drip but does not include hydrogenated vegetables in the candle composition.

Other patents describe candles containing a mixture of paraffin wax grades having varying melting points. A low melting paraffin wax candle containing as a major constituent a paraffin wax that has a melting point between 110–125° F. and as a minor constituent a crystalline paraffin wax with a melting point between 145–160° F. is disclosed by U.S. Pat. No. 2,825,635. The disclosed composition also contains about 2% by weight oil and is claimed to have oil retention properties up to about 2.5% by weight of oil. Accordingly, the candle burns cleaner without leaving residue on the walls of the container.

U.S. Pat. No. 3,046,101 discloses a fatty acid combined with a wax composition containing 3 wax components, each with spaced apart melting point ranges to improve burning qualities. A preferred embodiment of the invention comprises 3–30% by volume stearic acid, 70–97% by volume wax composition consisting of 45–55% paraffin wax with a melting point of 125–132° F., 32–42% paraffin wax with a melting point of 130–136° F., and 10–16% paraffin wax with a melting point of 149–155° F. This composition stiffens the finished candle and prevents the candle from softening at temperatures that are lower than the melting point of the composition.

U.S. Pat. No. 3,216,921 discloses a wax composition comprising 60–95% by weight of a low melting wax having a melting point in the range of 125–135° F. and 5–40% by weight of the high melting wax having a melting point, preferably from 150–170° F.

U.S. Pat. No. 4,568,270 teaches a composition consisting of an outer shell, an inner core, and a wick, wherein the shell comprises a paraffin wax, or other grade of wax, or combination thereof with a melting point in the range of 131–145° F. and the core comprises a fragrance oil and a low melting wax with a melting point in the range of 110–125° F.

U.S. Pat. No. 4,855,098 discloses a candle composition comprising one mixture of 10–90% by weight a semi-refined paraffin wax with a melting point in the range of 120–125° F. and 2% oil, a second mixture of 10–90% by weight fully-refined paraffin wax with a melting point in the range of 125–130° F. and 0.2% oil, and a polymer such as Vybar 260.

U.S. Pat. No. 5,171,329 claims a candle composition having butter oil added to a solidified oil and mixed in a ratio of between 5:3 to 3:5 to form a wax-like state of fat which can be used as a candle material. The butter oil is composed of 50–58% palm oil, 30–35% coconut oil, 5–8% soybean oil, 5–8% cottonseed oil and a hydrogenate of palm oil. The solidified oil may contain at least 80–90% palm oil and 10–20% soybean oil. Paraffin is not disclosed for use in this composition.

A candle composition comprising 5–40% paraffin wax, 5–10% candle scent, 0.25–1% binding agent, 50–90% soybean oil, and 1–5 drops of liquid dye is disclosed by U.S. Pat. No. 6,214,918. A preferred embodiment suggests a composition comprising 16.75% paraffin wax with a melting point of 125° F., 8% candle scent, 0.25% binding agent, 75% soybean oil, and 1–5 drops of liquid dye. However, this composition only uses one grade of paraffin wax.

U.S. Pat. No. 6,284,007 teaches a vegetable oil and paraffin wax candle having from 1–99% free fatty acids and 1–99% triglycerides making up the vegetable oil. The vegetable oil portion comprises more of the candle composition than the paraffin wax. Different melting point waxes can be used in the candle.

U.S. patent application publication U.S. 2001/0013195 A1, published Aug. 16, 2001, discloses a candle composition comprising a low melting point and a high melting point paraffin wax and a vegetable lipid composed of triglycerides, or a mixture of free fatty acids and triglycerides. The published application is a continuation application of U.S. Pat. No. 6,284,007. The patent application publication discloses several preferred fatty acid components including palmitic acid, stearic acid, oleic acid, behenic acid and arichidic acid, all of which are saturated or monounsaturated. The vegetable lipid component is preferably present in the composition in greater concentration by weight than the paraffin wax mixture. One preferred embodiment comprises 51% by weight a vegetable lipid component derived from a single fatty acid or mixture of saturated and monounsaturated fatty acids and a paraffin wax mixture containing a medium paraffin wax with a melting point range of 122–149° F. and a micro paraffin wax with a melting point range of 167–185° F.

A common convention in candle compositions is the use of candle wax, a material having certain favorable characteristics such as phase stability at room temperature, water repellence, smooth texture, hydrocarbon structure, low odor, combustibility, and low reactivity. Although wax may be derived from various sources such as animal fat and plants, wax is derived most commonly in the candle industry from petroleum in the form of paraffin wax. It comes in various grades and melting points, and is predominantly comprised of fully saturated long chain hydrocarbons. Even though paraffin wax is ideal in the candle industry for economic reasons, it is not considered to be healthy because it is a petroleum by-product documented to have toxins, black soot and even carcinogens. Vegetable oils are often looked to as preferred substitutes for the unhealthy paraffin wax used in candles because they are derived from plants, are non-toxic, do not produce soot, and are 100% biodegradable.

Also, vegetable oils have chemically active carbon—carbon double bonds and oxygen atoms which are likely to react with each other through hydrogen bonding. Hydrogenated vegetable oils are unsaturated fatty acids which have been saturated with hydrogen molecules. The hydrogen bonding entangles the molecules, thereby inhibiting the movement and flow of the molecules and resulting in a viscous type of material. The resulting viscous oils burn longer in candles than free-flowing materials like pure molten paraffin due to slow capillary action in the wick, which makes them good substitutes for hydrocarbon fuels. Accordingly, a candle composition having a greater amount of hydrogenated vegetable oil than paraffin wax results in a candle with novel burning characteristics such as improved viscosity, consumption, burn rate, and reduction in soot, while being healthier for the average consumer.

Finally, most compositions with candle wax such as paraffin wax and beeswax burn uniformly thereby burning the aromatic fragrance oils as quickly as the wax. According to the present invention, the combination of a low melting point wax/high melting point wax mixture and a particular hydrogenated vegetable oil mixture having almost no free fatty acids, preserves the burning of the fragrance oil, while also forming crystallization circles within the composition.

SUMMARY OF THE INVENTION

It is an object of the present invention to provide a healthier candle having a greater amount of hydrogenated vegetable oil than paraffin wax.

It is a further object of the present invention to provide a candle having hydrogenated vegetable oil that contains no more than 0.15% free fatty acid.

It is another object of the present invention to provide a candle having novel burning and fragrance characteristics.

Accordingly, a candle composition is provided having a high melting point paraffin wax, a low melting point paraffin wax, and a hydrogenated vegetable oil mixture that exists in a greater amount than the mixture of the varying grades of paraffin wax, and contains no more than 0.15% free fatty acid with the remainder being triglycerides.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWINGS

The only drawing is a front view of a jar containing the composition of the invention.

DESCRIPTION OF THE PREFERRED EMBODIMENTS

Figure 1:
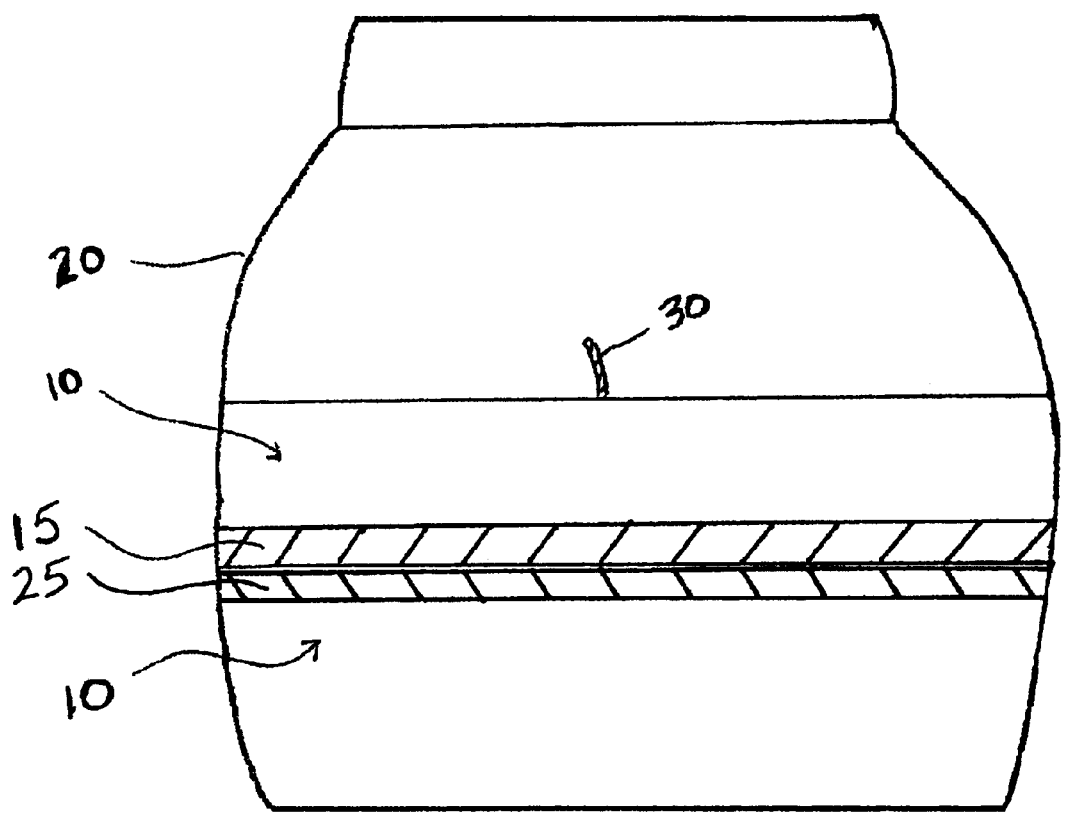

Referring now to the drawings, in which like reference numerals are used to refer to the same or similar elements, FIG. 1 shows a jar 20 containing a candle composition 10 with a wick 30.

The jar 20 is a solid container that may be any shape, but which preferably has rounded or circular walls. It may be made of glass, plastic, or any other material capable of containing the candle composition within and withstanding the heat from the burning of the candle. The candle composition 10 contained within the jar 20, has a homogenous mixture of hydrogenated vegetable oil, low melting point paraffin wax, high melting point paraffin wax, a polymer binding agent, fragrance, dyes, and may contain other stabilizers.

Paraffin waxes of different grades are provided in the composition. In particular, a low melting point ("LMP") paraffin wax and a high melting point ("HMP") paraffin wax are provided. Paraffin wax has large well-formed crystals, and is preferred over microcrystalline wax, which has small, irregular crystals. The paraffin waxes in the present invention are sometimes referred to as "slack waxes" or "feed stocks" prior to refining into the resulting wax. No additives are included in the feed stocks, so that the refined paraffins are pure hydrocarbon mixtures. The refined paraffin waxes used in the composition are pure hydrocarbon mixtures having chain lengths ranging from 20–50 carbons.

The candle composition 10 also contains hydrogenated vegetable oil ("HVO"). Hydrogenated vegetable oils are fatty acids which have been saturated with hydrogen molecules, making then good substitutes for hydrocarbon fuels. One preferred embodiment of a hydrogenated vegetable oil is a soybean/cottonseed mixture composed of 88% wt. soybean and 12% wt. cottonseed oil, which has been treated with hydrogen and a suitable catalyst to decrease the number of double bonds and increase the degree of saturation. This HVO has an iodine value of about 68–72.

However, other oils having fatty acids with more than one double bond (e.g, polyunsaturated oils) may also be used so long as they are hydrogenated, such that the final iodine value is in the range of 65 to 75. Since oils are fatty acid esters of glycerol, the properties of an oil are distinguished by the fatty acids with which the glycerol is esterified. Oils high in polyunsaturated fatty acids such as linoleic acid (18 carbon atoms, 2 double bonds) are preferred. Light oils with loosely packed molecules are also preferred. Oils used in the present invention may also contain smaller amounts of other secondary fatty acids such as oleic acid and palmitic. However, oils such as palm oil, having primarily oleic and palmitic acid with an iodine value of about 53, will not suffice.

When a candle having the candle composition 10 is lit, the LMP paraffin, having a higher oil content than HMP paraffin, co-crystallizes with the HVO. As a result, the HMP paraffin burns from the candle melt pool preferentially. The melt pool of the candle, and thus, the available fuel supply is made larger due to the HMP paraffin burning preferentially. The LMP paraffin/hydrogenated vegetable oil co-crystallization in the melt pool simultaneously causes the fragrance oil in the composition to burn less preferentially, due to its natural affinity to the hydrogenated vegetable oil. The candle composition 10 therefore provides significantly higher fragrance impact during the useful life of the candle because the fragrance oil is burned less preferentially. Overall, safer container temperatures for a filled candle are maintained since the LMP paraffin is less preferentially burned.

The combination of LMP and HMP paraffin with hydrogenated vegetable oil, which results in the preferential burning of the HMP paraffin, also produces a unique effect on the appearance of a filled candle after the candle is burned. Once the paraffin wax solidifies, one or more crystallization rings 15 and/or color layers 25 are formed below the surface layer of the candle. The crystallization rings 15 and darker color layers 25 are indicative of the co-crystallization occurring while the candle burns.

However, only certain hydrogenated vegetable oils will co-crystallize with the LMP paraffin such that the HMP preferentially burns. The co-crystallization of the HVO may depend on several factors such as its melting point and iodine value.

The melting point of an HVO varies as a function of the chain length of its fatty acids, the degree of saturation of its fatty acids, and the arrangement of its fatty acids on the glycerol backbone. An HVO crystallizes most readily and has a lower melting point when its molecules can be easily realigned. Alignment is easiest when the molecules that make up the HVO are most similar.

The HVO, like all other vegetable oils, is comprised of high molecular weight fatty acids, some of which are covalently bonded to a glycerol backbone as triglycerides. The relative amount of free fatty acids making up the oil varies depending on the type of vegetable oil, and results when fatty acids are not esterified to glycerol. HVO crystallization is improved with less free fatty acid content because alignment is easier among similar triglyceride molecules and is more difficult when free fatty acids are to be aligned with triglycerides. The HVO in candle composition 10 should contain less than 0.5% wt. free fatty acid, and preferably the HVO has no more than 0.3% wt. free fatty acids. Most preferably, the HVO includes no more than 0.15% wt. free fatty acids, the remainder of the HVO in each case being triglycerides.

In addition, triglycerides are normally comprised of three fatty acids of varying lengths and configurations protruding out from the glycerol backbone. Greater similarity among these fatty acid chains results in better crystallization and lower melting point. A preferred HVO will be composed of oils having primarily linoleic acid with 18 carbons, and will have an iodine value in the range of 65 to 75. Both soy and cottonseed derivations, or a combination thereof, have inherent saturation and melting point characteristics that are capable of inducing the formation of crystallization rings, whereas other vegetable oil derivations such as palm, corn and sunflower oils are too unstable to induce preferential burning consistently due to their differing fatty acid chain lengths and arrangements.

The amount of HVO in the candle composition may range from 10% to 83% to produce the crystallization rings 15 and dark color layers 25. However, the preferred range of the amount of HVO is 50.1% to 83%, and a most preferred embodiment of the present invention, as demonstrated in Example 1 below, contains 50.5% HVO. It is important that the candle composition contains more HVO than paraffin wax to provide better burn characteristics, such as improved viscosity, burn rate, consumption and a reduction in soot.

Paraffin wax candles can be brittle or may have minor flaws. The addition of a polymer such as polyethylene, helps to eliminate some of the flaws in the portions of the composition containing paraffin wax, by causing the paraffin to form smaller crystals when it solidifies. The smaller crystals provide a denser crystalline structure which is more resistant to structural flaws. Also, as the paraffin wax flows toward the wick, it is artificially entangled by the polyethylene, thereby causing the candle to burn longer. Polyethylene may also provide a transparent effect to the candle composition 10. Finally, the addition of polyethylene increases the oil-holding capacity and oil and dye anchoring of the paraffin wax that is particularly important with respect to the fragrance oils that are normally added to candles.

Acceptable ranges for the components of the candle composition are shown in the following table:

| Ingredient | % Weight of Total |
| --- | --- |
| HVO | 10–83 |
| High Melt Paraffin | 1–10 |
| Low Melt Paraffin | 1–32.5 |
| Polymer | 0–1 |
| Fragrance | 0–6 |
| Dye | 0–1 |

As seen in the table above, additives may also be incorporated into the composition. Additives may include fragrance, dyes, antioxidants, and UV inhibitors for protecting the candle composition 10 from UV damage due to sunlight such as fading. One or all of these additives may be included in the candle composition 10.

EXAMPLE 1

A preferred embodiment of the candle composition 10 contains 50.5% wt. HVO and 42.5% wt. paraffin waxes. The HVO is 88% soybean oil and 12% cottonseed oil, hydrogenated in the presence of a suitable catalyst, and made commercially available by Mid-Atlantic. The HVO has no greater than 0.15% free fatty acid content, with the remainder being triglycerides. This composition contains 32.5% wt. LMP paraffin and 10% wt. HMP paraffin, both commercially available from IGI under the trade names 1230 and 1245, respectively.

Other additives include 1% wt. high melting point polymer Vybar 103, which may be obtained from Baker Hughes and 6% wt. fragrance oil, commonly available from various sources as an aromatic compound. Negligible amounts of dye, antioxidant, and UV inhibitor are also present. The dye formula is preferably oil-soluble because of the paraffin wax/HVO composition of the candle and consists of Sandoplast Blue 2B at 0.0002%, Sandoplast Orange 3G at 0.0002%, Nitrofast Red A-4B at 0.0013%, and Sandoplast Violet FBL at 0.0024%.

EXAMPLE 2

A 100 g formula of the candle composition 10 of Example 1 may be made in the following manner. The 32.5% wt. LMP (1230 grade) paraffin wax and 10% wt. HMP (1245 grade) paraffin wax are measured out into a beaker with the 1% wt. Vybar 103 and heated to 75° C. The mixture is to be stirred, either with a stir bar or an overhead mixer. Then, 50.5% of the HVO must be added until the mixture is clear indicating homogeneity. Maintaining the heat at 75° C., the dye, antioxidant, and UV inhibitor must then be added and mixed until the composition is again homogenous. Finally, the fragrance oil is to be added and mixed for at least 20 minutes and homogeneity.

EXAMPLE 3

A candle inside a transparent jar 20, having a candle composition 10 and a wick 30 may be made in the following manner. A wick must be waxed and strung through the wick clip. Then the wick clip must be crimped. The crimp should be as close to the top of the clip as possible, with no extra wick protruding from the bottom of the clip. Using 3M High Melt adhesive 3769 Softening Point 240 glue, the wick must be affixed to the center of the jar 20. The glue should completely obstruct the bottom opening of the wick clip. The wick must remain centered. Once the entire candle composition 10 has been mixed to homogeneity as described in Example 2, the jar 20 is heated and the formula is poured into the jar.

EXAMPLE 4

Using samples according to the candle composition 10, contained in a 7.5 ounce glass container using a CD-N 10 wick, the invention can be demonstrated in the following manner.

Several samples were burned to completion, and evaluated for the appearance of crystallization rings and darker color layers after 10 and 20 hours of burn time. The samples provided had varying ranges of the HVO, paraffin waxes, and Vybar 103. However, all provided samples contained the same amount of additives such as fragrance oil and dye formula.

The crystallization and darker color patterns occurred among the samples having only HVO and no paraffin wax. However, the crystallization and darker color patterns were not inhibited by the addition of paraffin wax to the HVO formulation. These patterns were also noted in samples having blended LMP and HMP paraffin wax without HVO, although the crystals were smaller and more randomly scattered. However, when each paraffin wax component was tested separately without HVO, these patterns did not occur.

Samples containing a blend of HVO and both paraffin wax grades, had a better burn performance than samples containing only the HVO or a blend of only the paraffin wax grades. These samples consumed at about 85%, burned cleaner with less soot, and had increased burn times. The crystallization and darker color patterns were consistently found in a blend of HVO and paraffin wax grades where the usage range of the HVO in the formulation was 10% to 83%.

While a specific embodiment of the invention has been shown and described in detail to illustrate the application of the principles of the invention, it will be understood that the invention may be embodied otherwise without departing from such principles.

What is claimed is:

1. A candle comprising:
   a fuel mixture comprising 10–83% wt. of a vegetable oil having no more than 0.3% wt. of the vegetable oil is free fatty acids, and a petroleum wax mixture of a high melting point paraffin wax and a low melting point paraffin wax; and
   a wick at least partly embedded in the fuel mixture.

2. A candle according to claim 1, further comprising a container holding the fuel mixture and wick.

3. A candle according to claim 2, wherein the container is transparent so that the fuel mixture is visible through walls of the container.

4. A candle according to claim 3, wherein the wax mixture comprises from 1–32.5% wt. of the total fuel mixture of low melting point paraffin wax and 1–10% wt. of the total fuel mixture high melting point paraffin wax.

5. A candle according to claim 1 wherein the wax mixture comprises from 1–32.5% wt. of the total fuel mixture of low melting point paraffin wax and 1–10% wt. of the total fuel mixture high melting point paraffin wax.

6. A candle according to claim 5, wherein the fuel mixture further comprises a polymer.

7. A candle according to claim 6, wherein the fuel mixture further comprises at least one additive selected from the group consisting of a fragrance, a dye, a UV inhibitor and an antioxidant.

8. A candle according to claim 6, wherein the vegetable oil comprises a blend of soy oil and cottonseed oil.

9. A candle according to claim 6, wherein the vegetable oil is hydrogenated.

10. A candle according to claim 1, wherein the vegetable oil comprises a blend of soy oil and cottonseed oil.

11. A candle according to claim 1, wherein the vegetable oil is hydrogenated.

12. A candle composition comprising a fuel mixture comprising 10–83% wt. of a hydrogenated vegetable oil having no more than 0.3% wt. of the hydrogenated vegetable oil is free fatty acids, from 2–43% wt. of a mixture of a high melting point paraffin wax and a low melting paint paraffin wax, and a polymer.

13. A candle composition according to claim 12, wherein the hydrogenated vegetable oil comprises a blend of soy oil and cottonseed oil.

14. A candle composition according to claim 13, wherein the wax mixture comprises from 1–32.5% wt. of the total composition of low melting point paraffin wax and 1–10% wt. of the total composition of high melting point paraffin wax.

15. A candle composition according to claim 14, further comprising at least one additive selected from the group consisting of a fragrance, a dye, a UV inhibitor and an antioxidant.

16. A candle composition comprising:
   a mixture of a high melting point paraffin wax and a low melting point paraffin wax; and
   10–83% wt. of a vegetable oil comprising no more than 0.3% wt. free fatty acids, the vegetable oil being present in a greater percentage by weight of the composition than the mixture of paraffin waxes.

17. A candle composition according to claim 16, comprising 50–83% wt. of said vegetable oil.

18. A candle composition according to claim 16, wherein the mixture of paraffin waxes comprises from 1–32.5% wt. of the total composition low melting point paraffin wax and 1–10% wt. of the total composition high melting point wax.

19. A candle composition according to claim 16, wherein said vegetable oil is hydrogenated.

20. A candle composition according to claim 19, wherein said hydrogenated vegetable oil is cottonseed oil, soybean oil, or a combination thereof.

21. A candle composition according to claim 20, wherein said hydrogenated vegetable oil is a blend of 88% wt. soybean oil and 12% wt. cottonseed oil.

22. A candle composition according to claim 21, wherein the blend of vegetable oil comprises between about 50%–83% wt. of the candle composition.

23. A candle composition according to claim 22, further comprising a polymer, a fragrance oil and a dye.

24. A candle composition according to claim 23, wherein the mixture of paraffin waxes comprises between about 2–43% wt. of the candle composition.

25. A candle composition according to claim 22, wherein the mixture of paraffin waxes comprises between about 2–43% wt. of the candle composition.

26. A candle composition comprising:

a first paraffin wax having a first melting point;

a second paraffin wax having a second melting point lower than the first melting point, the first and second paraffin waxes forming a paraffin wax mixture;

10–83% wt. of a vegetable oil consisting of no more than 0.3% wt. of the vegetable oil is free fatty acids and the remainder is triglycerides, and the vegetable oil is present in greater percent by weight of the composition than the paraffin wax mixture.

27. A candle composition according to claim 26, wherein the paraffin wax mixture comprises between about 2–43% wt. of the candle composition.

28. A candle composition according to claim 26, further comprising a polymer, a fragrance oil and a dye.

29. A candle composition according to claim 26, wherein the first paraffin wax comprises 1–10% wt. of the total composition and the second paraffin wax comprises 1–32.5% wt. of the total composition.

30. A candle composition according to claim 26, wherein said vegetable oil is hydrogenated.

31. A candle composition according to claim 30, wherein the hydrogenated vegetable oil is cottonseed oil, soybean oil, or a combination thereof.

32. A candle composition according to claim 31, wherein said hydrogenated vegetable oil is a blend of 88% wt. soybean oil and 12% wt. cottonseed oil.

* * * * *